United States Patent [19]
Heath

[11] Patent Number: 5,625,628
[45] Date of Patent: Apr. 29, 1997

[54] ALOHA OPTIMIZATION

[75] Inventor: Robert G. Heath, San Diego, Calif.

[73] Assignee: Hughes Electronics, Los Angeles, Calif.

[21] Appl. No.: 404,707

[22] Filed: Mar. 15, 1995

[51] Int. Cl.$^6$ .............................. H04B 7/212; H04J 3/17
[52] U.S. Cl. .............................................................. 370/321
[58] Field of Search ...................... 370/79, 85.7, 95.1, 370/95.3, 97

[56] References Cited

U.S. PATENT DOCUMENTS

| | | | |
|---|---|---|---|
| 4,504,946 | 3/1985 | Raychaudhuri | 370/95.3 |
| 5,239,545 | 8/1993 | Buchholz | 370/95.1 |
| 5,295,140 | 3/1994 | Crisler et al. | 370/95.3 |
| 5,353,285 | 10/1994 | Van Der Plas et al. | 370/85.7 |

*Primary Examiner*—Wellington Chin
*Attorney, Agent, or Firm*—John T. Whelan; Wanda K. Denson-Low

[57] ABSTRACT

An method of Aloha optimization involves designating a time period as an inroute frame. Such designating includes designating a first portion of the inroute frame as a Transaction Reservation portion, and designating a second portion of the inroute frame as an Aloha portion. A request is transmitted from a first remote terminal to the host terminal that the host terminal allocate one or more slots of the Transaction Reservation portion to the first remote terminal. One or more unallocated slots within the Transaction Reservation portion are then redesignated as extra Aloha slots. A target slot is then randomly selected by a second remote terminal from the slots within the Aloha portion and the extra Aloha slots.

5 Claims, 2 Drawing Sheets

| 50 | 52 | 54 | 56 |
|---|---|---|---|
| STREAM | TRANSACTION | USER ALOHA | CONTROL ALOHA |

ALOHA OPTIMIZATION

BACKGROUND OF THE INVENTION

The present invention relates to bandwidth optimization in an integrated satellite network, and more particularly to optimization of an Aloha component of bandwidth in such an integrated satellite network.

The user aloha is one of the methods used in an Integrated Satellite Business Network (ISBN) to transfer data from a remote port to a hub over a spacelink. The spacelink has two data paths referred to herein respectively as the inroute and the outroute. The inroute refers to a data path from the remote port card to an earth orbit satellite, and from the earth orbit satellite to the hub. The outroute refers to a data path from the hub to the earth orbit satellite, and from the earth orbit satellite to the remote port. Typically, a plurality of remote port cards are used to service a corresponding plurality of user devices, whereas a single hub is used to service a single host. The entire data path, both inroute and the outroute are referred to herein as the spacelink.

The term remote terminal as used herein, refers to the user device and the remote port card collectively. The term host terminal, as used herein, refers to the hub and the host device collectively.

The inroute is temporally subdivided into units referred to herein an inroute frame. The inroute frame is further functionally subdivided into a first component referred to as the Stream component, a second component referred to as the Transaction Reservation component, a third component referred to as the User Aloha component, and a fourth component referred to as the Control Aloha component. All of these components, except the Control Aloha component, are optional and can be selected by the network operator.

The smallest subdivision of the inroute frame is referred to as a slot, the size of which depends upon the frequency used to carry the inroute frame. There are eight bytes per slot in a 128K inroute (90 slots and 720 bytes total per inroute frame).

The portion of each inroute frame allocated to stream is assigned by the host terminal to a single remote terminal and is used for communications from the single remote terminal to the host terminal via the earth orbit satellite.

The portion of each inroute frame allocated to User Aloha Control Aloha and Transaction Reservation is configured by a network operator and is controlled by the hub. User Aloha and Control Aloha are configured as X' number of slots per burst and Y bursts User Aloha and Y' bursts Control Aloha per frame. Once configured, this allocation, in accordance with heretofore known integrated satellite business networks, remains the same in every inroute frame, and can only be changed manually by the network operator.

Typically, the User Aloha component is used by the remote terminal to communicate information such as credit card authorizations, and other relatively short, infrequent and unscheduled communications. The Transaction Reservation component, on the other hand, is used for file transfers and other lengthy transactions. In order to send a message via user aloha, the remote terminal selects one of the bursts within the User Aloha at random, and sends the message. In contrast, in order to send a message via transaction reservation, the remote terminal first send a transaction request via Control Aloha (by selecting one of the bursts within the Control Aloha component at random, and sending the request during the selected burst). Once the host terminal receives the transaction request, it replies to the remote terminal on the outroute, assigning the remote terminal slots within the Transaction Reservation component (assuming such slots are available). Problematically however, both transaction requests sent over Control Aloha, and messages sent over User Aloha may be sent from one remote terminal in the same burst as a transaction request, or message, respectively, being sent by another remote terminal. In this event, a collision occurs, and neither of the two messages is received by the host terminal. After a timeout expires at each of the remote terminals that sent the collided transaction request or User Aloha message, the transaction request or User Aloha message is resent—and hopefully does not collide a second time.

Because the inroute is preconfigured by the network operator based generally on statistical analysis of typical usage of the inroute, the number of slots allocated to Transaction Reservation and the number of bursts allocated to User Aloha may not be optimal for a given data load at a given time. During, e.g., daylight hours the available Transaction Reservation slots are relatively unused, while at night when large file transfers are more common amongst integrated satellite business network users Transaction Reservation slots can be at a premium. Similarly, while the configured User Aloha slots are relatively unused at night, they are highly utilized during the day when small messages, such as credit card authorizations, are more prevalent. As a result, each inroute frame, at any given time, may contain a number of unused slots within the Transaction Reservation or User Aloha components. At the same time as the Transaction Reservation component (or User Aloha component) is highly utilized, the User Aloha component (or Transaction Reservation component) may go virtually unused. The result of a highly utilized User Aloha component is increased collisions, and therefore increased delay in transmitting User Aloha messages. The result of a highly utilized transaction reservation component is greater delay in allocating Transaction Reservation slots, and increased requests for additional Transaction Reservation slots—due to the failure of the host terminal to reserve all of the slots requested during an initial request. These increased requests for additional Transaction Reservation slots result in greater traffic in the Control Aloha component, which in turn results in a greater occurrence of collisions in the Control Aloha component. Note that even when there are no Transaction Reservation slots in use there is still a chance that there will be a collision in the Control Aloha component.

SUMMARY OF THE INVENTION

The present invention advantageously provides for improved bandwidth optimization in an integrated satellite network, and in particular optimization of Aloha in such a network.

In one embodiment, the invention can be characterized as a method of improved Aloha in an integrated satellite network. The method involves designating a time period as an inroute frame during which information can be communicated via an earth orbit satellite from one or more of a plurality of remote terminals to a host terminal. This designating includes designating a first portion of the inroute frame as a Transaction Reservation portion, and designating a second portion of the inroute frame as an Aloha portion.

In the event a Transaction Reservation packet of information is to be communicated from a first of the plurality of remote terminals, a request is transmitted from the first of the plurality of remote terminals to the host terminal that the host terminal allocate one or more slots of the Transaction Reservation portion to the first of the plurality of remote terminals. After the request, if any, has been fulfilled, one or more unallocated slots within the Transaction Reservation portion are redesignated as extra Aloha slots.

In the event an aloha packet of information is to be communicated from a second of the plurality of remote terminals, a target slot is selected from the slots within the Aloha portion and the extra Aloha slots. Because the selection is made from both the Aloha portion, and the extra Aloha slots, the second of the plurality of remote terminals has a greater number of slots from which to select than it would have had if it selected from only the Aloha portion. This greater number results in a decreased probability of collisions between the Aloha packet from the second of the plurality of remote terminals, and other Aloha packets that may be transmitted from others of the plurality of remote terminals.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

Figure 1:
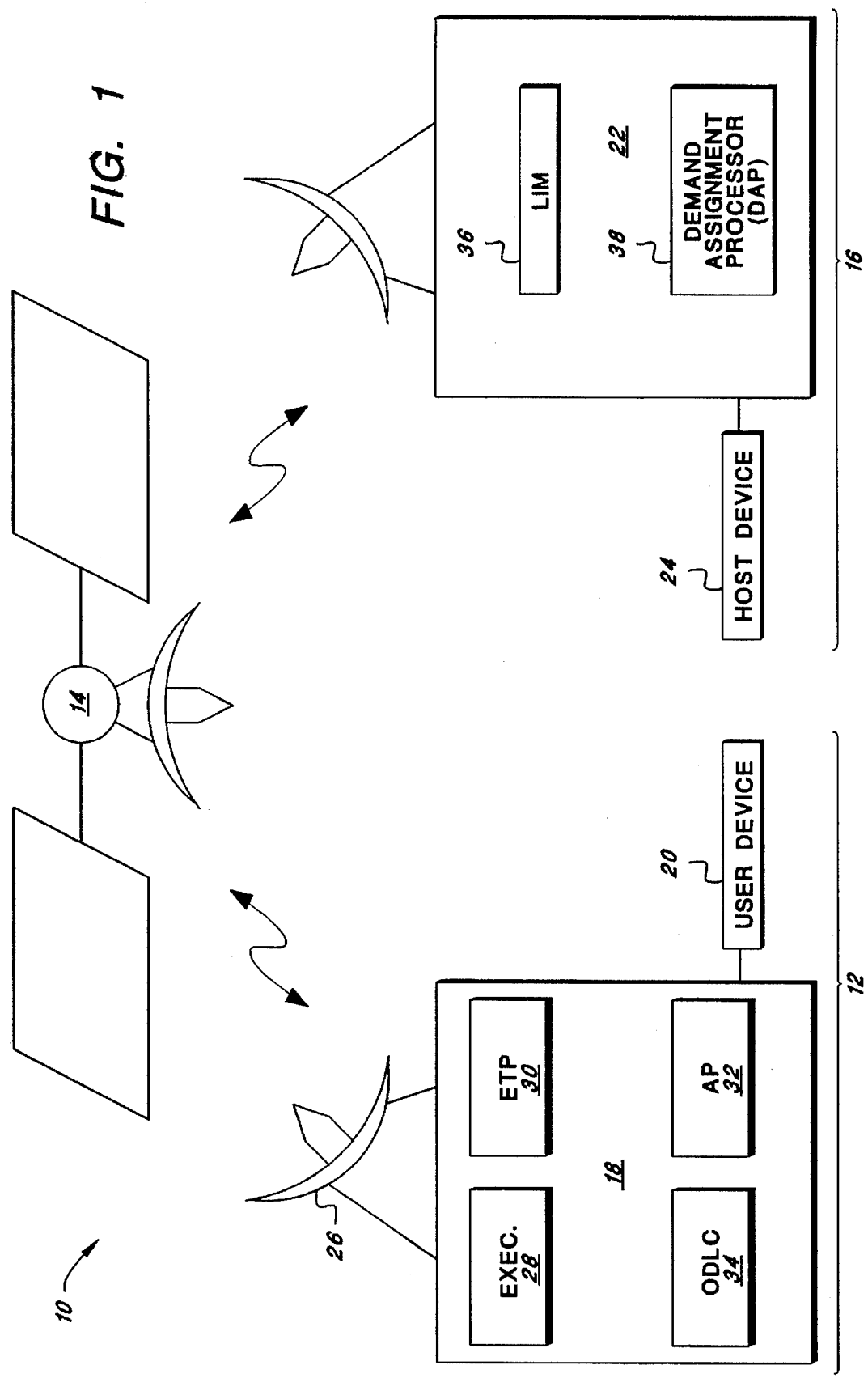
FIG. 1 is a schematic block diagram of an Integrated Satellite Business Network suitable for carrying out the teachings of one embodiment of the present invention.

Corresponding reference characters indicate corresponding components throughout the several views of the drawings.

The following description of the presently contemplated best mode of practicing the invention is not to be taken in a limiting sense, but is made merely for the purpose of describing the general principles of the invention. The scope of the invention should be determined with reference to the claims.

Referring first to FIG. 1, a schematic block diagram is shown of an Integrated Satellite Business Network 10 (ISBN) suitable for carrying out the teachings of one embodiment of the present invention. A remote terminal 12 is coupled via airwaves to an earth orbit satellite 14, and the earth orbit satellite 14 is coupled via airwaves to a host terminal 16. The remote terminal 12 includes both a remote network interface 18 (or remote port) and a user device 20. The user device 20 can be one of a number of possible user devices, e.g., a personal computer, a mini computer, a dumb terminal, or the like. The host terminal 16 consists of a host network interface 22 and a host device 24. The host device 24 can consist of, e.g., a main frame computer or the like.

The remote network interface 18 employs a satellite antenna 26 and suitable communications hardware (not shown), such as is commonly known in the art. In addition, the remote network interface 18 employs a number of subsystems, several of which are relevant to the present embodiment. First, the remote network interface 18 employs a System Executive subsystem 28, which is preferably implemented as part of a software control system that modifies a processor within the remote network interface 18. The System Executive subsystem 28 performs task scheduling and control. Second, an enhanced transaction processor 30, also preferably implemented using the control software, is used to extract broadcast messages from the hub, and to pass information extracted from the broadcast messages along to other subsystems within the remote terminal 12. Third, an Aloha processor 32 is used to randomly select a burst within the number of bursts allocated to User Aloha, or Control Aloha, in which an outgoing Aloha message will be transmitted. Fourth, a Optimum Data Link Control 34 (ODLC) insures sequential, error free, delivery of data packets from the remote terminal to the host terminal.

Within the host network interface 22, a number of subsystems also perform various functions relevant to the present embodiment. These subsystems are also preferably realized as a part of a software control system that modifies a processor within the host network interface 22. A Line Interface Module 36 (LIM) serves as an interface between the host network interface and the host device and performs processing functions for the host device. Another subsystem used in the host network interface is a Demand Assignment Processor 38 (DAP). The Demand Assignment Processor 38 controls the allocation of slots within each inroute frame, and, using a prioritization algorithm, makes Transaction Reservation assignments once per frame for one frame at a time. Every frame interval (45 ms) a frame that is ten frames in the future is processed by the Demand Assignment Processor 38 and Transaction Reservation slots are assigned in the form of bursts. The frame ten frames in the future is processed in order to allow time for the Transaction Reservation assignments to be sent to the remote terminals 12 before the frame itself must be sent.

After making Transaction Reservation assignments, but before sending the broadcast message containing the assignments to the remotes, the Demand Assignment Processor 38, in accordance with the present embodiment, redesignates unassigned (i.e., unreserved or unallocated) Transaction Reservation slots as extra User Aloha slots in multiples of the preconfigured User Aloha burst size. The number of additional User Aloha bursts allocated is placed into the broadcast message containing the Transaction Reservation assignments for the upcoming frame. This broadcast message is then sent to all remote terminals monitoring the inroute. Based on this broadcast message, remote terminals 12 having requested Transaction Reservation slots are informed as to whether and to what extent their requests are fulfilled, and all of the remote terminals 12 networked with the host terminal 16 are informed as to the number of Transaction Reservation slots that are redesignated as extra User Aloha slots. In accordance with the present embodiment, in the event there are no Transaction Reservation requests on queue and, thus, no Transaction Reservation assignments for a particular inroute frame, a broadcast message is sent to the remote terminals 12 containing only the number of Transaction Reservation slots redesignated as extra User Aloha bursts for the specified inroute frame.

The broadcast message containing the Transaction Reservation assignments is received by the remote terminals 12 monitoring the inroute two frames before the packets must be processed that could be sent during the assigned slots within the upcoming frame. The Enhanced Transaction Processor 30 within the remote terminal 12 parses the broadcast message containing the Transaction Reservation assignments and passes the assigned number of extra User Aloha bursts for the upcoming frame to the Aloha Processor 32. When the remote terminal 12 has a packet to send via the User Aloha, the Aloha Processor 32 randomly selects a burst from the designated number of User Aloha bursts plus the number of extra User Aloha bursts within which to transmit the packet. Because the Aloha Processor 32 adds the number of extra User Aloha bursts in the upcoming frame to the number of designated User Aloha bursts, the number of User Aloha bursts is increased from which it randomly selects a burst in which to transmit the packet.

In the event another remote terminal on the inroute also randomly selects the same burst in which to transmit the packet of information, the two packets of information will collide and neither will be received by the host.

After failing to receive acknowledgment of the transmitted User Aloha packet within a timeout period, the remote terminal 12 attempts to resend the packet a second time. On the second attempt to send the packet lost due to collision, the Aloha Processor 32 totals a number of bursts available in the next several frames and selects at random a burst within such number of bursts to utilize for transmission. Thus, the number of configured User Aloha bursts per frame is effectively multiplied by the number of frames over which the Aloha Processor 32 selects the random bursts. To this multiplied number of frames is added the number of extra User Aloha bursts allocated within the next two frames, in order to determine the total number of bursts from which the Aloha Processor 32 will select a random burst for retransmission of the packet. This random selection from a larger number of User Aloha bursts following a collision is referred to as "backing off."

The Aloha Processor 32, in this embodiment, does not attempt to predict the allocation of additional User Aloha bursts beyond those received from the demand assignment processor for the next two frames. However, once a burst has been randomly selected in a frame, the Aloha processor 32 waits for that randomly selected burst before transmitting the packet. Any extra bursts that are allocated beyond those allocated in the next two frames, are "counted" for purposes of "waiting" for the selected random burst. Thus, if additional bursts continue to be allocated in future frames, beyond the next two frames, the packet may be transmitted in an earlier frame than would otherwise be anticipated.

For example, if there are eight bursts designated as User Aloha bursts, and in the next frame the broadcast message indicated that there are four extra User Aloha bursts and in the frame two frames after the current frame there are two extra User Aloha frames indicated, and the remote terminal has randomly selected the forty-fifth User Aloha burst out of the next fifty-four User Aloha bursts in which to retransmit a previously collided User Aloha message, the User Aloha message will be transmitted in the fifth frame following the current frame, assuming no other extra User Aloha bursts are allocated. However, in the event four extra User Aloha bursts are designated in the third frame following the current frame, and six extra User Aloha frames are designated in the fourth frame following the current frame, the forty-fifth User Aloha burst will occur during the fourth frame following the current frame, thus causing the transmission of the User Aloha message one frame earlier than it would have been transmitted absent the designation of the other extra User Aloha bursts.

In accordance with another embodiment of the invention, no User Aloha bursts are designated by the network operator. Thus in this embodiment, only Stream, Transaction Reservation and Control Aloha make up the inroute frame. In a manner similar to that described above, unallocated Transaction Reservation slots are allocated as Control Aloha bursts. Thus, in the event there is little or no traffic in the Transaction Reservation component, most or all of the slots in the Transaction Reservation component are redesignated as Control Aloha slots. Similarly, when the Transaction Reservation slots are all or almost all allocated, no or few extra Control Aloha bursts are allocated.

Advantageously, the present embodiment causes the probability of a collision to decrease whenever there is less Transaction Reservation traffic, which is when requests sent over Control Aloha are most likely to be honored anyway. Similarly, when Transaction Reservation is highly utilized, i.e., when transaction requests are likely to be dishonored, the probability of a collision increases. Thus, the number of "wasted" transaction requests, i.e., transaction requests that collide, but otherwise would have been honored, is reduced by the present embodiment by the redesignating of unused Transaction Reservation slots as Control Aloha bursts (in multiples of the Control Aloha burst size) whenever there are unused Transaction Reservation slots.

Figure 2:
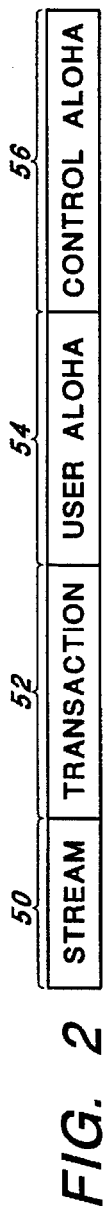
FIG. 2 is a schematic block diagram of a typical inroute frame format used in an Integrated Satellite Business Network (ISBN)

Referring next to FIG. 2, a schematic diagram is shown of a typical inroute frame format used in an Integrated Satellite Business Network (ISBN) to transfer data from the remote terminal to the host terminal over the space link via the inroute. As can be seen, a first group of slots within the frame is allocated as the Stream 50. As mentioned above, the Stream 50 is used in a conventional manner in the embodiments described herein.

The next group of slots is designated by the host terminal as the Transaction Reservation component 52. Generally, the Transaction Reservation component 52 is a group of slots that are assigned on demand by the hub for use in transmitting information from a remote to the hub. The Transaction Reservation component 50 is commonly used, for example, for performing file transfers, where a large amount of data must be prescheduled for transmission over the inroute.

In contrast, the next component of the inroute frame is the User Aloha component 54, which consists of a group of bursts (each made of Y slots) that are randomly utilized by remote terminals to transmit short messages from the remote terminals to the host terminal.

In the event two or more remote terminals randomly select the same User Aloha burst within which to transmit information during a particular frame, a collision occurs and neither of the packets of information reach the host. In this case, the transmitting remote terminals will time out after a preconfigured period of time during which the remote terminals fail to receive an acknowledgment from the host terminal. In this event, the remote terminals retransmit the failed User Aloha transmission (after "backing off", as described above) in hopes that a subsequent transmission does not result in a collision. As will be understood by one skilled in the art, as User Aloha traffic increases, the probability of collisions also increases.

The last group of allocated slots in FIG. 2 is the Control Aloha component 56. Control Aloha 56 is used by the remote terminals to transmit control messages to the host terminal and is allocated by the remote terminals based on a random selection similar to that used to allocate User Aloha 54. As with transmissions made over the User Aloha component 54, transmissions made over the Control Aloha component 56 may from time to time result in collisions. Thus, as utilization of the Control Aloha component 56 increases, the probability of a collision occurring also increases.

As shown in FIG. 2, the Stream component 50, the Transaction Reservation component 52, the User Aloha component 54 and the Control Aloha component 56, are all preconfigured fixed portions of the inroute frame. Such preconfiguration is performed by the network administrator at the host terminal. Unfortunately, as is frequently the case, from time to time the Transaction Reservation component 52 may be under utilized, or not utilized at all. Similarly, as is also frequently the case, the User Aloha component 54 may be from time to time under utilized or not utilized at all. Unfortunately, in heretofore available Integrated Satellite Business Systems, fine tuning of the size of the Transaction Reservation component and the User Aloha component had to be performed based on statistical analysis of the utilization of inroute frames over a long period of time. This statistical analysis, while representing an optimum allocation of slots within the inroute frame over a large period of time, often is not reflective of the optimum allocation of slots between the Transaction Reservation component and the User Aloha component for any given short period of time. For example, as described above, many users of Integrated Satellite Business Networks perform credit card verification transactions at random times during the business day. These credit card verification transactions are relatively short and occur at unpredictable times. Thus, they are suited for transmission over the User Aloha component 54 of the inroute frame. The same users, however, frequently transfer large files to the host terminal, such as daily reports, during the night. These large file transmissions, in contrast to the relatively short credit card verification transmissions, lend themselves to transmission over the Transaction Reservation component 52 of the inroute frame. While the remote terminals are able to dynamically allocate these transmissions to either the User Aloha component 54 or the Transaction Reservation component 52, because many remote terminals have similar transmissions to transmit during particular times of the day, the Transaction Reservation component 52, for example, may go virtually unused during certain hours, e.g., during the daytime, while the User Aloha component 54 may go virtually unused during others, e.g., during the nighttime.

Figure 3:
FIG. 3 is a frame diagram of an inroute frame wherein a Transaction Reservation component has been dynamically redesignated in its entirety so as to provide extra User Aloha bursts.
Figure 4:
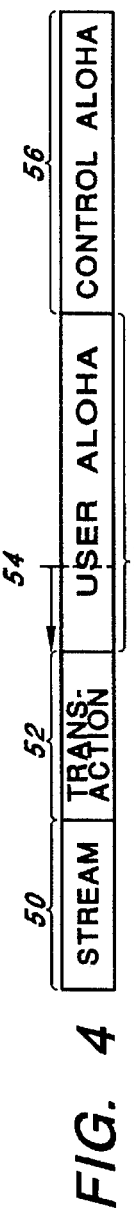
FIG. 4 is a frame diagram of an inroute frame wherein the Transaction Reservation component has been dynamically redesignated in part as extra User Aloha bursts.
Figure 5:
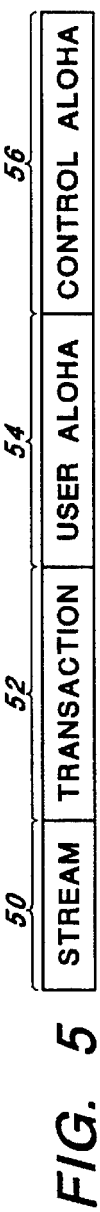
FIG. 5 is frame diagram of an inroute frame wherein the Transaction Reservation component is utilized in its entirety, thereby inhibiting the redesignation of Transaction Reservation slots as User Aloha bursts.

Referring next to FIGS. 3, 4 and 5, frame diagrams are shown of an inroute frame wherein the User Aloha component 54 is dynamically allocated by the hub as a function of the traffic present on the Transaction Reservation component 52 of the inroute frame. The present embodiment allows the network operator to define several parameters that permit the implementation of what is referred to herein as User Aloha optimization. First, the network administrator may disable User Aloha optimization and thereby opt to have a particular Integrated Satellite Business Network function in a conventional manner. As shown in FIG. 3, the entire Transaction Reservation component is allocable to User Aloha. In practice, this configuration will permit the entire Transaction Reservation component 52 to be redesignated for 54 in the event there are no Transaction Reservation slots assigned. When there are Transaction Reservation requests, however, these requests will be serviced by allocating the Transaction Reservation component 52. Any remaining slots within the Transaction Reservation component 52, after all outstanding Transaction Reservation requests have been serviced, will be redesignated as User Aloha 54. Thus, all, some or none of the Transaction Reservation component 52 may, in any given frame, be dynamically redesignated as User Aloha 54. In FIG. 4, a frame diagram is shown wherein a portion, i.e., one or more slots, of Transaction Reservation component 52 is reserved. The remaining, unreserved, slots within the Transaction Reservation component 52 are redesignated by the host terminal as User Aloha 54. Such redesignation is broadcast to all of the remote terminals in the Integrated Satellite Business Network using the same message that is used to broadcast transaction reservations. This broadcast is sent two frames before the frame for which the broadcast makes Transaction Reservation assignments and/or redesignation of Transaction Reservation slots 52 to User Aloha bursts 54.

Another parameter that affects the allocation of the component 54 is the User Aloha component size. In accordance with the present embodiment, the User Aloha size is, in effect, a minimum size in that the User Aloha may in fact be larger than the configured User Aloha size for any given inroute frame. (Such is the case when Transaction Reservation slots 52 are redesignated as User Aloha bursts 54.) The User Aloha component 54, however, will never be smaller than the configured User Aloha size. As shown in the frame diagram of FIG. 5, all of the designated Transaction Reservation slots 52 have been reserved by the host terminal. Thus, none of the Transaction Reservation slots 52 are redesignated as User Aloha 54, and only those slots designated by the network administrator function as User Aloha bursts 54. Note that in a particular case, it may be desirable to configure the minimum User Aloha component size to zero, thus relying entirely on dynamically redesignated Transaction Reservation slots 52 for use as User Aloha bursts 54. One consequence of this configuration, however, is that there will be no User Aloha bursts 54 available when all Transaction Reservation slots 52 are assigned by the host terminal. During times of extremely heavy Transaction Reservation traffic, User Aloha messages, therefore, will be unable to be transmitted.

Figure 6:
FIG. 6 is a frame diagram of an inroute frame format wherein a network administrator has configured the inroute frame to have no User Aloha bursts.

Referring next to FIG. 6, a frame diagram is shown wherein the network administrator has designated that no User Aloha bursts will be allocated. Thus, as can be seen, three components make up the integrated satellite business network frame: the Stream component 50, the Transaction Reservation component 52 and the Control Aloha component 56. As these three components are described herein above, further description is not provided here. As with heretofore known allocation schemes for User Aloha, the fixed allocation for Control Aloha by the network administrator at the host terminal also suffers from potentially inefficient bandwidth utilization. For example, when neither the Transaction Reservation component 52 nor the Control Aloha component 56 are highly utilized, or when the Control Aloha component 56 is highly utilized and the Transaction Reservation component 52 is not highly utilized, collisions still result among messages being transmitted on Control Aloha 56 when two or more remote terminals randomly select the same burst in which to transmit Control Aloha messages.

Figure 7:
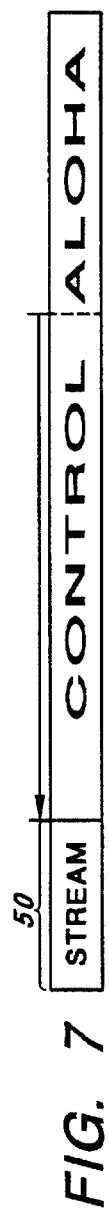
FIG. 7 is a frame diagram of an inroute frame wherein the Transaction Reservation component has been dynamically redesignated in its entirety as Control Aloha bursts.
Figure 8:
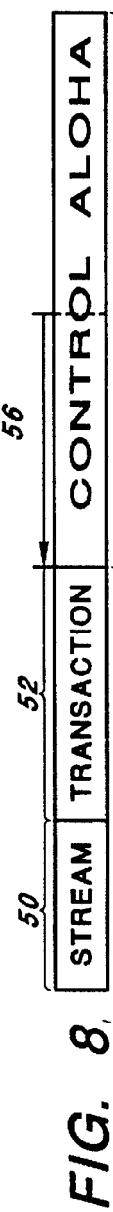
FIG. 8 is a frame diagram of an inroute frame wherein the Transaction Reservation component has been dynamically redesignated in part as Control Aloha bursts.
Figure 9:
FIG. 9 is a frame diagram of an inroute frame wherein the Transaction Reservation component is utilized in its entirety, thereby inhibiting the redesignation of slots within the transaction component as Control Aloha bursts.

Referring next to FIGS. 7, 8 and 9, a frame diagram is shown of an Integrated Satellite Business Network frame wherein unused Transaction Reservation bursts are dynamically redesignated as Control Aloha bursts. As with the redesignation of Transaction Reservation slots as User Aloha bursts described above, the network administration is able to configure several parameters. One of these parameters allows the network administrator to disable Control Aloha optimization, causing the host terminal to perform in a conventional manner. Another parameter allows the network administrator to specify the number of Control Aloha bursts 56 (which is effectively a minimum number of Control Aloha bursts). In FIG. 7, an exemplary frame is shown wherein no Transaction Reservation requests have been queued. As a result, no slots within the Transaction Reservation component 52 are reserved. In accordance with the present embodiment, the host terminal dynamically redesignates these Transaction Reservation slots 52 as Control Aloha bursts 56 (to the extent Transaction Reservation slots are available in multiples of the configured Control Aloha burst size). By increasing the number of designated Control Aloha bursts 56, the host terminal is able to significantly reduce the likelihood of collisions between Control Aloha transmissions from the remote terminals. When some Transaction Reservation transmissions have been requested and allocated by the hub, as shown in FIG. 8, the number of redesignated Transaction Reservation slots 52 is reduced so as to recapture these slots for Transaction Reservation purposes. When a limited number of Transaction Reservation requests have been made, some Transaction Reservation bursts 52 are still dynamically redesignated as Control Aloha bursts 56. As Transaction Reservation activity increases, the dynamically allocated Transaction Reservation bursts 52 may become completely allocated as Transaction Reservation bursts 52, as shown in FIG. 9, leaving only the preallocated Control Aloha bursts 56 available for Control Aloha messages. Note that in some cases the network administrator may wish to allocate very few bursts as Control Aloha bursts 56, relying on the dynamic redesignation of Transaction Reservation slots 52 to provide bandwidth for Control Aloha transmissions. The consequence of this allocation of Control Aloha is that when transaction reservation traffic is high, Control Aloha will be small. The result of this small Control Aloha is that requests for additional Transaction Reservation slots will not get through to the host terminal, because of collisions. As fewer Transaction Reservation slots 52 within each frame are reserved, the number of Control Aloha bursts 56 increases, thereby increasing the probability that requests for additional Transaction Reservations will be successfully received by the host terminal. Thus, a sort of self-tuning Control Aloha component 56 is created wherein Control Aloha permits more requests for Transaction Reservation slots 52 when there are more Transaction Reservation slots 52 available.

While the invention herein disclosed has been described by means of specific embodiments and applications thereof, numerous modifications and variations could be made thereto by those skilled in the art without departing from the scope of the invention set forth in the claims.

What is claimed is:

1. A method of Aloha optimization in an integrated satellite network comprising the steps of:

designating a time period as an inroute frame during which information can be communicated via an earth orbit satellite from one or more of a plurality of remote terminals to a host terminal, the designating step further comprising the steps of:
designating a first portion of the inroute frame as a Transaction Reservation portion; and
designating a second portion of the inroute frame as an Aloha portion;

requesting, in the event a Transaction Reservation portion is to be communicated from a first of the plurality of remote terminals, that the host terminal allocate one or more slots of the Transaction Reservation portion to the first of the plurality of remote terminals;

redesignating one or more unallocated slots within the Transaction Reservation portion as extra Aloha slots; and selecting at least one target slot, in the event an Aloha packet is to be communicated from a second of the plurality of remote terminals, from a group of slots comprising slots within the Aloha portion and the extra Aloha slots.

2. The method of claim 1 further comprising:

transmitting said Aloha packet of information in said target slot.

3. The method of claim 2 wherein said step of selecting from said group of slots comprises the step of:

selecting said target slot randomly from said group of slots.

4. The method of claim 3 wherein said step of designating of said second portion of said inroute frame as said Aloha portion comprises the step of:

designating said second portion of said inroute frame as a User Aloha portion.

5. The method of claim 3, wherein said step of designating of said second portion of said inroute frame as said Aloha portion comprises the step of:

designating said second portion of said inroute frame as a Control Aloha portion.

* * * * *